US011920294B2

(12) United States Patent
Eklind et al.

(10) Patent No.: US 11,920,294 B2
(45) Date of Patent: Mar. 5, 2024

(54) SYSTEM FOR IN-LINE TREATMENT OF THREAD WITH A MECHANISM TO SELECTIVELY POSITION A DISCHARGE DEVICE

(71) Applicant: COLOREEL GROUP AB, Jönköping (SE)

(72) Inventors: Martin Eklind, Jönköping (SE); Joakim Staberg, Jönköping (SE); Fredrik Lennartsson, Henån (SE)

(73) Assignee: COLOREEL GROUP AB, Jönköping (SE)

( * ) Notice: Subject to any disclaimer, the term of this patent is extended or adjusted under 35 U.S.C. 154(b) by 522 days.

(21) Appl. No.: 17/275,780

(22) PCT Filed: Aug. 28, 2019

(86) PCT No.: PCT/SE2019/050805

§ 371 (c)(1),
(2) Date: Mar. 12, 2021

(87) PCT Pub. No.: WO2020/055302

PCT Pub. Date: Mar. 19, 2020

(65) Prior Publication Data

US 2022/0042242 A1 Feb. 10, 2022

(30) Foreign Application Priority Data

Sep. 15, 2018 (SE) .................................... 1851094-1

(51) Int. Cl.

| | |
|---|---|
| ***D06P 5/30*** | (2006.01) |
| ***D06B 1/08*** | (2006.01) |
| *B41J 3/407* | (2006.01) |

(52) U.S. Cl.

CPC .................. *D06P 5/30* (2013.01); *D06B 1/08* (2013.01); *B41J 3/4078* (2013.01); *D06B 2700/36* (2013.01)

(58) Field of Classification Search

CPC ......... D06P 5/30; D06B 1/08; D06B 2700/36; B41J 3/382; B41J 32/02; B41J 17/28; B41J 32/00

See application file for complete search history.

(56) References Cited

U.S. PATENT DOCUMENTS

| | | | |
|---|---|---|---|
| 4,259,026 | A | 3/1981 | Seiji et al. |
| 7,715,939 | B2 | 5/2010 | Kuki et al. |

(Continued)

FOREIGN PATENT DOCUMENTS

| | | | |
|---|---|---|---|
| CN | 103930608 | A | 7/2014 |
| CN | 105986386 | A | 10/2016 |

(Continued)

OTHER PUBLICATIONS

International Search Report from PCT/SE2019/050805, dated Nov. 8, 2019, pp. 1-5.

*Primary Examiner* — Thinh H Nguyen
(74) *Attorney, Agent, or Firm* — Robinson & Cole LLP

(57) ABSTRACT

A system for in-line treatment of thread for use with a thread consuming device is provided. The system includes a treatment unit including at least one discharge device being configured to dispense one or more coating substances onto the at least one thread when activated; and a drive unit being configured to move said at least one discharge device between an idle position and an operational position being arranged along an axis of movement.

19 Claims, 6 Drawing Sheets

(56) References Cited

U.S. PATENT DOCUMENTS

| | | | | |
|---|---|---|---|---|
| 2003/0020786 | A1 | 1/2003 | Silverbrook | |
| 2005/0046667 | A1 | 3/2005 | Ando et al. | |
| 2007/0204775 | A1* | 9/2007 | Ogawa | B41J 3/4078<br>112/102 |
| 2007/0245940 | A1* | 10/2007 | Wahlstrom | D05B 67/00<br>112/270 |
| 2008/0011212 | A1 | 1/2008 | Kuki et al. | |
| 2013/0286093 | A1 | 10/2013 | Tomoyuki | |

FOREIGN PATENT DOCUMENTS

| | | | |
|---|---|---|---|
| CN | 107849768 | A | 3/2018 |
| CN | 107849770 | A | 3/2018 |
| EP | 1724118 | A2 | 11/2006 |
| JP | S54100808 | A | 8/1979 |
| JP | 63218358 | A | 9/1988 |
| JP | S63299930 | A | 12/1988 |
| JP | H06305129 | A | 11/1994 |
| JP | 3000390 | B | 1/2000 |
| JP | 2002200379 | A | 7/2002 |
| WO | 2016204686 | A1 | 12/2016 |
| WO | 2016204687 | A1 | 12/2016 |
| WO | 2018044222 | A1 | 3/2018 |

* cited by examiner

SYSTEM FOR IN-LINE TREATMENT OF THREAD WITH A MECHANISM TO SELECTIVELY POSITION A DISCHARGE DEVICE

CROSS REFERENCE TO RELATED APPLICATIONS

The instant application is a U.S. National Stage application of and claims priority to PCT/SE2019/050805, filed on Aug. 28, 2019, which is a PCT application of and claims priority to SE Application No. 1851094-1, now SE 543 118 C2, filed on Sep. 15, 2018, the subject matter of both aforementioned applications are hereby incorporated by reference in their entireties.

TECHNICAL FIELD

The present invention relates to the technical field of thread consuming devices, and systems therefore. In particular, the present invention relates to a system comprising a treatment unit to be used in association with such thread consuming device.

BACKGROUND

It has been suggested to provide thread consuming devices, such as embroidery machines or the like, with in-line apparatuses designed to provide the thread with a certain treatment. Such in-line apparatuses could e.g. be used to colour the thread, whereby multiple colour nozzles and control thereof could replace the current use of multiple pre-coloured threads when producing multi-coloured embroidery using embroidery machines. In prior art systems in which threads of different colours are used, one thread, having a first specified colour, is used for a first set of stitches while another thread, having a second specified colour, is used for another set of stitches.

In order to eliminate the obvious drawbacks of the requirement of multiple threads of different colours, the present applicant has filed several patent applications on the technique of in-line treatment of thread, such as WO2016204687 and WO2016204686. The plurality of nozzles needs to be accurately aligned with the thread in order to dispense one or more coating substances onto it with high accuracy. The proposed solutions of the documents mentioned above are directed to improvements in terms of colouring quality and also reduces the complexity of the thread consuming device.

However, in order to further improve the quality of the in-line colouring of threads it would be advantageous if the in-line apparatus could be arranged in different operating states in order to perform different tasks, such as for example a first state of dispensing a coating substance to a thread and a second state of performing a cleaning session. Importantly, when returning to the first state the nozzles must be accurately aligned with the thread since during the operational position dispensing of the coating substances onto the thread takes place.

SUMMARY

An object of the present invention is therefore to address the problem mentioned above, and to provide a solution overcoming the disadvantages of prior art. More specifically, the present invention provides a solution where a discharge device of a system for in-line treatment of a thread is configured to be selectively arranged in an operational position and one or more idle positions by means of a drive unit.

The one or more idle positions may e.g. correspond to a maintenance position, a wiping position, a spitting position, etc. Preferably, the system is configured to be operating independently of the operation of the associated thread consuming device, such that positioning of the discharge device into an idle position can be made even if the thread consuming device is running.

In a first aspect, a system for in-line treatment of thread for use with a thread consuming device is provided. The system comprises a treatment unit having at least one discharge device being configured to dispense one or more coating substances onto the at least one thread when activated, and a drive unit being configured to move said at least one discharge device between an idle position and an operational position by means of a transmission having different transmission ratios during the motion from the idle position towards the operational position of the discharge device during the motion from the idle position towards the operational position.

In one embodiment, the system comprises a treatment unit having at least one discharge device being configured to dispense one or more coating substances onto the at least one thread when activated, and a drive unit being configured to move said at least one discharge device between an idle position and an operational position being arranged along an axis of movement. The drive unit is configured to move said at least one discharge device by means of a mechanism providing different transmission ratios between the drive unit and the discharge device depending on the position of the discharge device along the axis of movement.

In an embodiment, the transmission ratio of the mechanism is lower when the discharge device is in the operational position than when the discharge device is between the idle position and the operational position. Increased resolution of the motion close to the operational position is thereby achieved, which is advantageous because of the very tight tolerance to align the discharge device with the thread.

The mechanism is also referred to as a transmission in the teachings herein and should be read to mean the same thing. The transmission may be configured to convert a rotary motion of the drive unit to a linear motion of the discharge device.

The system may further comprise a control unit being configured to control the operation of the drive unit.

In an embodiment, the treatment unit further comprises a position sensor configured to determine at least one position of the drive unit, and the control unit is configured to control the operation of the drive unit based on the determined position(s).

The mechanism may comprise an actuator at one end connected to the discharge device and at a second end connected to a crank being connected to the drive unit, thus forming a rod and crank mechanism operatively connecting the discharge device and the drive unit.

The actuator may comprise a connecting rod having a curved portion and a straight portion, wherein the curved portion is configured to accommodate a rotational axis of the drive unit. This specific shape of the actuator is advantageous in that the rotary motion may correspond to a rotation of 7C rad.

The transmission ratio may be proportional to a cosine function depending on the position of the crank such that a maximum transmission ratio is achieved when the discharge device is between the idle position and the operational position. The idle position and/or the operational position may in such embodiment be located near rad $\pi\pm\pi/2$ as measured from the angular position of the crank when the discharge device is approximately in the middle between idle position and the operational position The drive unit may comprise a motor; the motor may be a step motor, or a DC-motor.

The treatment unit may comprise at least two discharge devices and a control unit, wherein each discharge device is associated with a separate drive unit, and wherein the control unit is configured to control selective activation of each one of the discharge devices and the drive units.

Each discharge device may comprise a plurality of nozzles arranged at different positions relative the longitudinal extension of the at least one thread, the at least one thread being in motion in use, each nozzle being configured to dispense one or more coating substances onto the at least one thread when activated.

The nozzles are preferably inkjet nozzles, and the coating substance is preferably a colouring substance.

The system may further comprise a thread consuming device, such as an embroidery machine, a sewing machine, a knitting machine, a weaving machine, a tufting machine, a thread winding machine, or any combination thereof.

According to a second aspect, a method for in-line treatment of at least one thread is provided. The method comprises i) providing a treatment unit comprising at least one discharge device being configured to dispense one or more coating substances onto the at least one thread when activated; and ii) providing a drive unit, wherein the drive unit is configured to move said at least one discharge device between an idle position and an operational position being arranged along an axis of movement. The drive unit is configured to move said at least one discharge device by means of a mechanism providing different transmission ratios between the drive unit and the discharge device depending on the position of the discharge device along the axis of movement.

Definitions

Thread consuming device is in this context any apparatus, which in use consumes thread. It may e.g. be an embroidery machine, weaving machine, sewing machine, knitting machine, a tufting machine, a thread winding machine or any other thread consuming apparatus, which may benefit from a surface treatment or coating or any other process involving subjecting the thread to a substance, such as dying.

Treatment is in this context any process designed to cause a change of the properties of a thread. Such processes include, but are not limited to, colouring, wetting, lubrication, cleaning, fixing, heating, curing, dying, etc.

Thread is in this context a flexible elongate member or substrate, being thin in width and height direction, and having a longitudinal extension being significantly greater than the longitudinal extension of any parts of the system described herein, as well as than its width and height dimensions. Typically, a thread may consist of a plurality of plies being bundled or twisted together. The term thread thus includes a yarn, wire, strand, filament, etc. made of different materials such as glass fibre, wool, cotton, synthetic materials such as polymers, metals, or e.g. a mixture of wool, cotton, polymer, or metal, polyester, viscos, or any combination thereof.

Within this specification, all references to upstream and/or downstream should be interpreted as relative positions during normal operation of the thread consuming device, i.e. when the device is operating to treat an elongated substrate, such as a thread, continuously moving through the device in a normal operating direction. Hence, an upstream component is arranged such that a specific part of the thread passes it before it passes a downstream component.

BRIEF DESCRIPTION OF DRAWINGS

Embodiments of the invention will be described in the following description of the present invention; reference being made to the appended drawings, which illustrate non-limiting examples of how the inventive concept can be reduced into practice.

DETAILED DESCRIPTION

Figure 1A:
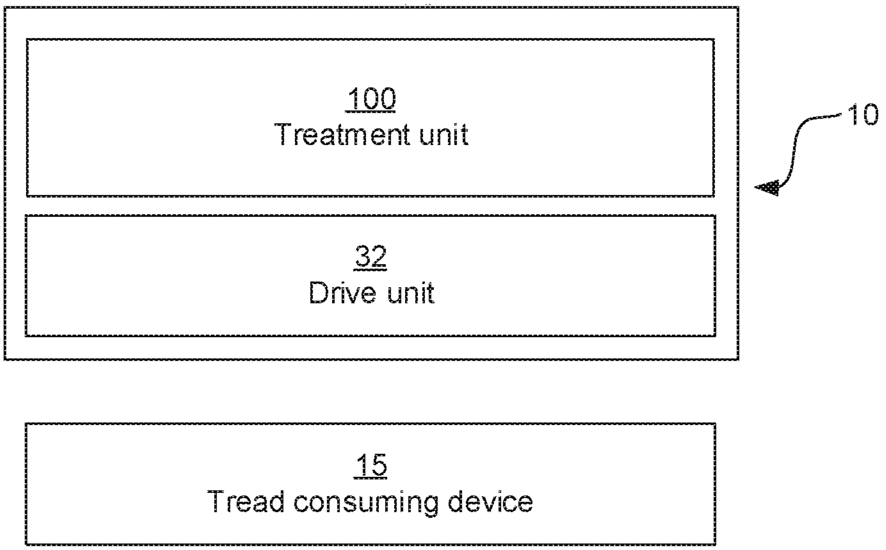
FIG. 1*a* is a schematic view of a system for in-line treatment of thread according to an embodiment.

An idea of the present invention is to provide a system and method for distributing a coating substance onto a thread in a controlled manner, for use in association with a thread consumption device. Starting in FIG. 1*a*, a schematic view of system 10 for in-line treatment of thread is shown. The system 10 comprises a treatment unit 100 for dispensing one or more coating substances onto at least one thread. The system 10 further comprises a drive unit 32, and the system 10 is configured to be used with at least one thread consuming device 15, which may e.g. be in the form of one or more embroidery machines, weaving machines, sewing machines, knitting machines, tufting machines, thread winding machines, etc. The system 10, together with the thread consuming device 15, thereby forms a thread consuming unit, including the at least one thread consuming device 15 and the treatment unit 100.

It should be noted that a thread consuming device 15 can in some embodiments be configured to consume a plurality of threads at the same time. Consequently, the treatment unit 100 may be configured to handle one or more threads at the same time.

As will be further understood from the following, for all embodiments the system for in-line treatment of thread requires a treatment unit 100, to be used with a thread consuming device, and a drive unit 32 (see e.g. FIG. 5) for moving at least one discharge device 150 of the treatment unit 100.

Figure 1B:
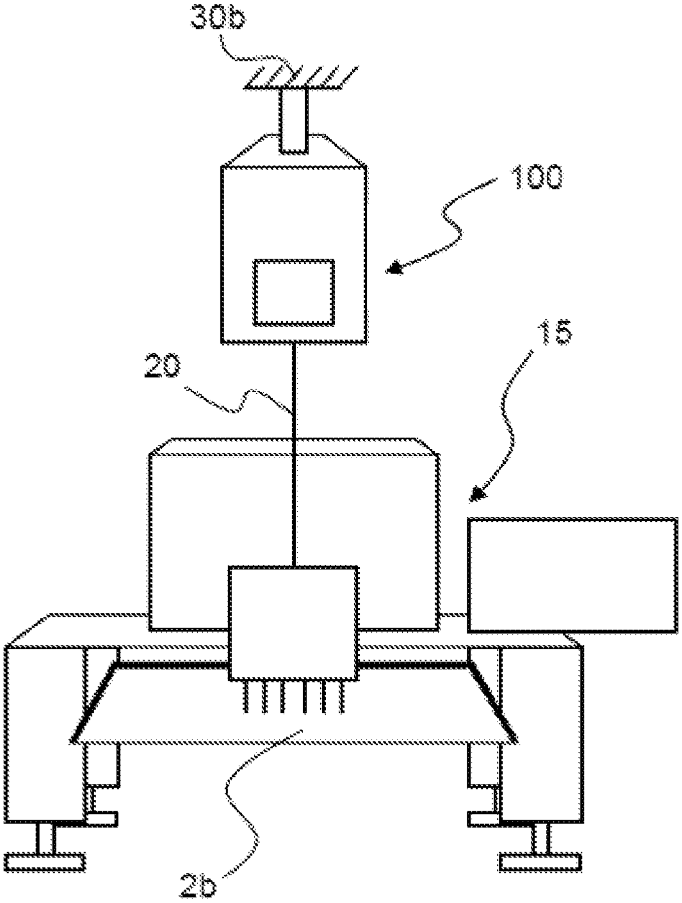
FIG. 1*b* is a perspective view of a system having a thread consuming device and a treatment unit according to an embodiment.

Now turning to FIG. 1*b* the thread consuming device 15 is exemplified as an embroidery machine 15, here illustrated as a single-head embroidery machine, being equipped with a treatment unit 100. The embroidery machine comprises a moveable stage 2*b* carrying the fabric to be embroidered. During operation the moveable stage 2*b* is controlled to rapidly change its position in the X and Y direction (i.e. in this particular example the horizontal plane).

The treatment unit 100 allows the embroidery machine 15 to operate without the provision of uniquely pre-coloured threads, as is required for conventional embroidery machines. Instead, the treatment unit 100 provides in-line colouring of a thread 20 in accordance with predetermined colouring patterns, such that a coloured embroidery can be produced. The treatment unit 100 thus replaces individual thread reels as is present in prior art systems. It should however by noted that the embroidery machine 15 may also be capable of operating with pre-coloured threads according to prior art, in combination with the in-line coloured thread as described above.

As is shown in FIG. 1*b* the only connection between the treatment unit 100 and the embroidery machine 15 is the thread 20, as well as electrical connections (not shown). The treatment unit 100 is thus preferably provided as a stand-alone unit having no or very little mechanical connection with the moveable stage 2*b*.

Figure 2:
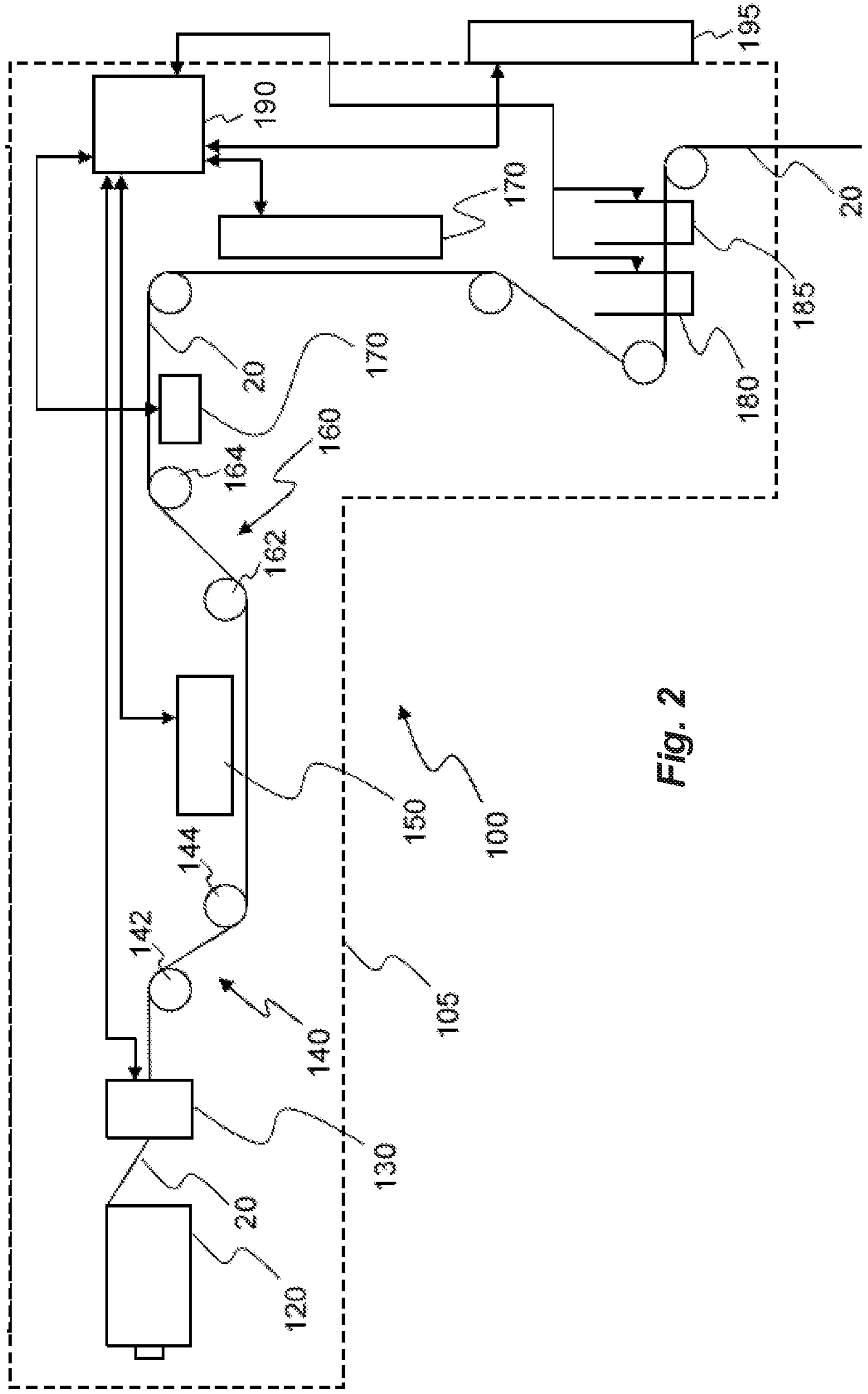
FIG. 2 is a schematic view of a treatment unit for use with a system according to an embodiment.

The various components of the treatment unit 100 are shown in FIG. 2. As can be seen in FIG. 2 a majority of the components are arranged inside a housing 105. A thread reel 120 is preferably carrying an un-treated (such as uncoloured) thread, or of any other standard colour which is suitable for in-line colouring to various other colours and/or colouring effects.

Immediately downstream the thread reel 120 a thread feeder 130 may be arranged, which is configured to pull the thread forward through the treatment unit 100. After passing the thread feeder 130 the thread 20 may engage with a thread guiding device 140. The thread guiding device 140, ensures that the thread 20 is aligned with one or more treatment nozzles forming part of at least one discharge device 150. The discharge device 150 is configured to discharge treatment substance, such as a colouring substance, onto the thread 20 as it passes the discharge device 150. For this the nozzles are arranged preferably in the longitudinal direction of the thread 20 as will be further explained in relation to FIGS. 3*a-c*. As will be explained further below, the discharge device 150 is moveable by means of a drive unit 32 (see e.g. FIG. 5).

Downstream the discharge device 150 another thread guiding device 160 is provided. The second thread guiding device 160 is cooperating with the first thread guiding device 140 such that the position of the thread 20 is correct during its travel along the discharge device 150.

The thread 20 is then fed forward to pass one or more fixation units 170 which are provided in order to fixate the treatment substance to the thread 20.

Before exiting the housing 105 the thread 20 can pass a cleaning unit 180, such as an ultrasonic bath, where unwanted particles are removed from the thread 20.

The treatment unit 100 may further comprise a lubrication unit 185 arranged inside the housing 105. Additional thread buffers and feeders (not shown) may also be included in the treatment unit 100, arranged at various positions in the thread path.

The thread 20 preferably exits the treatment unit 100 through an aperture or similar, whereby the thread 20 is forwarded to the associated thread consuming device, such as the embroidery machine 15 as is shown in FIGS. 1*a-b*.

The control unit 190 is provided with associated electronics, such as power electronics, communication modules, memories, etc. The control unit 190 is connected to the discharge device 150. The control unit 190 may also be configured to receive control signals from one or more components of the treatment unit 100, e.g. control signals for triggering specific control, or other information relating to e.g. thread consumption by the embroidery machine 15. Most importantly, the control unit 190 is connected to the at least one discharge device 150, as well as to its associated drive unit(s) 32.

The control unit 190 may be implemented by any commercially available CPU ("Central Processing Unit"), DSP ("digital signal processor") or any other electronic programmable logic device, or a combination of such processors or other electronic programmable logic device. The control unit 190 may be implemented using instructions that enable hardware functionality, for example, by using executable computer program instructions in a general-purpose or special-purpose processor that may be stored on a computer readable storage medium (disk, memory etc) to be executed by such a processor.

Figure 3:
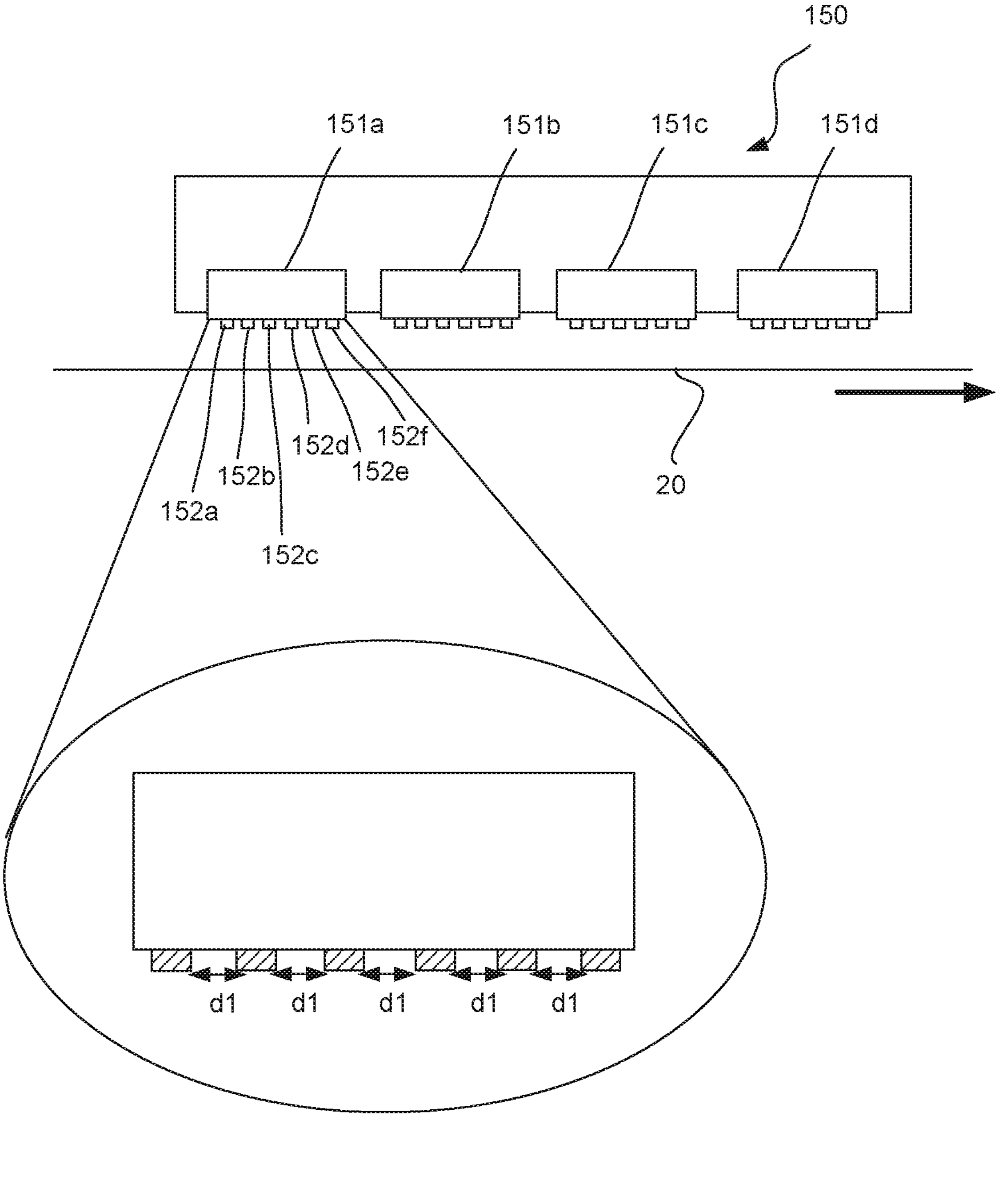
FIG. 3 is a schematic view of a discharge device forming part of a treatment unit.

In FIG. 3 a discharge device 150 is shown, forming part of the treatment unit 100 as described above. The direction of movement of the thread 20 in use is indicated by the solid arrow in FIG. 3. As will soon be described in more detail, the discharge device 150 comprises a plurality of nozzles 152*a-f* arranged at different longitudinal positions (for example spaced by a distance dl) along the thread 20 which passes by the treatment unit 100 during use.

Each nozzle 152*a-f* is arranged to dispense a coating substance, such as ink, onto the thread 20 when the nozzle is activated. The coating substance is absorbed by the thread 20, e.g. at different circumferential positions of the thread 20 when the thread 20 twists about its longitudinal axis. The relative position of two adjacently dispensed droplets of coating substance may be selected such that the droplets will overlap.

The treatment unit 100 comprises one or more discharge devices 150. Each discharge device 150 is preferably formed as a series of ink-jet print heads 151*a-d*, each print head 151*a-d* having one or more nozzle arrays. Each nozzle array typically comprises hundreds or thousands of nozzles. For illustrative purpose only six nozzles 152*a-f* are shown for one print head 151*a-d*; it should however be realized that each nozzle array may be provided with hundreds or thousands of nozzles 152 each. As an example, each print head 151*a-d* may be associated with a single colour; in the shown example, the discharge device 150 has four print heads 151*a-d*, each print head 151*a-d* being associated with a specific colour according to the CMYK standard. However, other colouring models may be used as well.

The exact configuration of the treatment unit 100 may vary. For example, the treatment unit 100 is provided with a single discharge device 150 having a plurality of print heads 151*a-d*. Each print head 151*a-d* is in turn provided with a plurality of nozzles 152*a-f*.

In another embodiment the treatment unit 100 is provided with several discharge devices 150, arranged either in series or in parallel. Each discharge device 150 is then provided with a plurality of print heads 151*a-d*. If serially arranged, the upstream discharge device 150 may have print heads 151*a-d* being associated with one or more colours of a specific colour standard, while the downstream discharge device 150 has print heads 151*a-d* being associated with other colours of the same colour standard. If arranged in parallel, each discharge device 150 may have print heads

151*a*-*d* being associated with all colours of a specific colour standard, but with different threads 20. For such embodiment, two separate threads 20 can be treated simultaneously and in parallel. Combinations of parallel/serial configurations are of course also possible.

In a yet further embodiment, the discharge device 150 is only having a single print head 151*a*-*d*; dynamic colouring of the thread 20 would then require several discharge devices 150 of the treatment unit 100.

Each nozzle 152*a*-*f* may dispense a coating substance having a colour according to the CMYK colour model, where the primary colours are Cyan, Magenta, Yellow, and Black. It may thus be possible to dispense a wide variety of colours onto the thread by activating nozzles 152*a*-*f* such that the total colouring substance of a specific length of the thread 20 will be a mix of the colouring substances dispensed by the nozzles 152*a*-*f*. As explained earlier, this is preferably achieved by having several print heads 151*a*-*d* arranged in series, whereby the nozzles 152*a*-*f* of a specific print head 151*a*-*d* are dedicated to a single colour.

In another embodiment, each nozzle 152*a*-*f* dispenses a coating substance having a colour comprising a mix of two or more primary colours of the CMYK colour model.

The control unit 190 is configured to control the activation of the nozzles 152*a*-*f* such as the coating substance is emitted onto the thread 20 as it passes through the treatment unit 100, and especially pass the discharge device 150. By such configuration very precise colouring of the thread 20 is possible e.g. in order to provide advanced embroidery patterns, visually extremely sophisticated by means of the colouring provided by the treatment unit 100.

For a colouring operation the control unit 190 receives one or more input signals specifying the desired colour and/or colouring effect. The colour input preferably includes information regarding the exact colour, as well as the longitudinal start and stop positions of the thread 20 for that particular colour. The longitudinal start and stop position could be represented by specific time values if the thread speed is determined, or by specific stitch numbers, or any value relating to such.

Figure 4A:
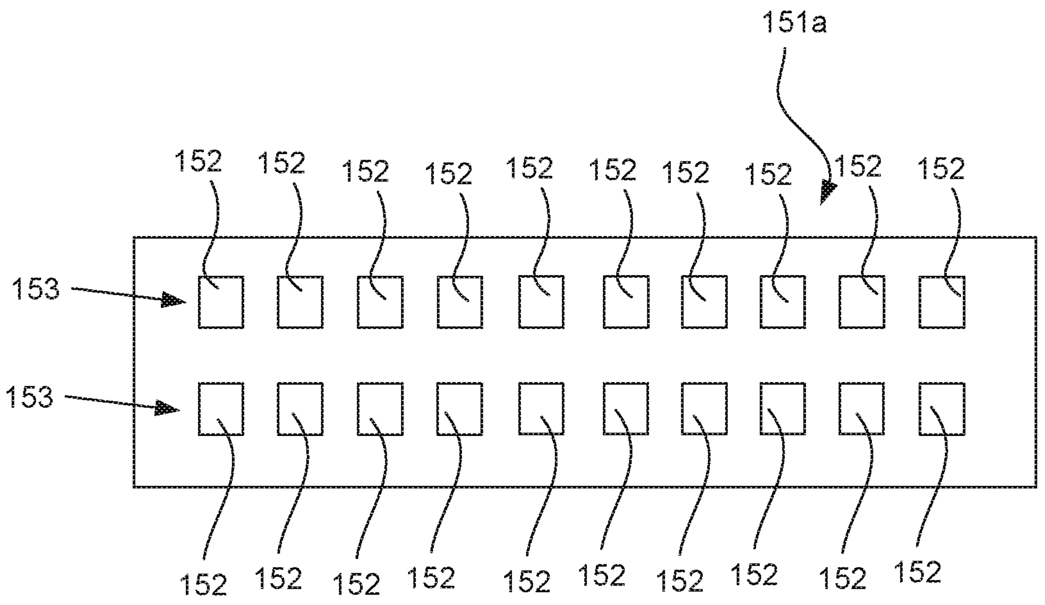
FIG. 4*a* is a schematic top view of a part of a discharge device according to an embodiment.
Figure 4B:
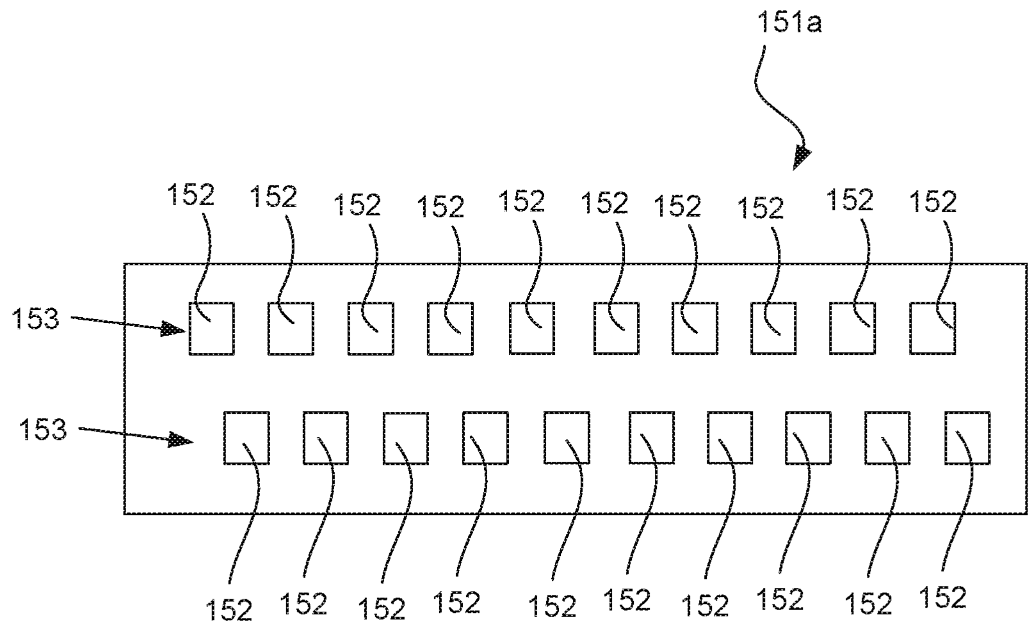
FIG. 4*b* is a schematic top view of a part of a discharge device according to an embodiment.

FIG. 4*a*-*b* illustrates a respective top view of a print head 151*a*. The print head 151*a* has a planar surface on which the nozzles 152 are arranged. As mentioned earlier, the total number of nozzles 152 of a single print head can be up to several thousands, provided on a print head 151*a* in the size of a couple of centimeters. In the shown example, a far less number of nozzles 152 are shown. The nozzles 152 can be distributed in one or more nozzle arrays 153. In FIG. 4*a*, the nozzles 152 are distributed in two parallel arrays 153. The arrays 153 are aligned with each other, such that nozzles 152 of one array 153 are arranged adjacent a nozzle 152 of the other array 153.

FIG. 4*b* shows a similar example, however there is a longitudinal offset between the two arrays 153.

It should be possible to arrange the discharge device 150 in different operating states in order to perform different tasks, such as for example a first state of dispensing a coating substance to a thread and a second state of performing a cleaning session, or other maintenance or idling. In a preferred embodiment, the discharge device 150 can be positioned in one or more printing states, corresponding to operating states. A first printing state where one nozzle array 153 is aligned with the thread 20, a second printing state where another nozzle array 153 is aligned with the thread 20, and so on. The discharge device 150 can also be positioned in any of the following idle states: a home position, a capping position, a wiping position (not necessarily a position but instead a distance), and a spitting position. Since correct positioning of the discharge device 150 is of great importance, in particular that the nozzles are accurately aligned with the thread during the operational position where dispensing of the coating substances onto the thread takes place, accurate control of the drive unit 32 is provided.

Figure 5:
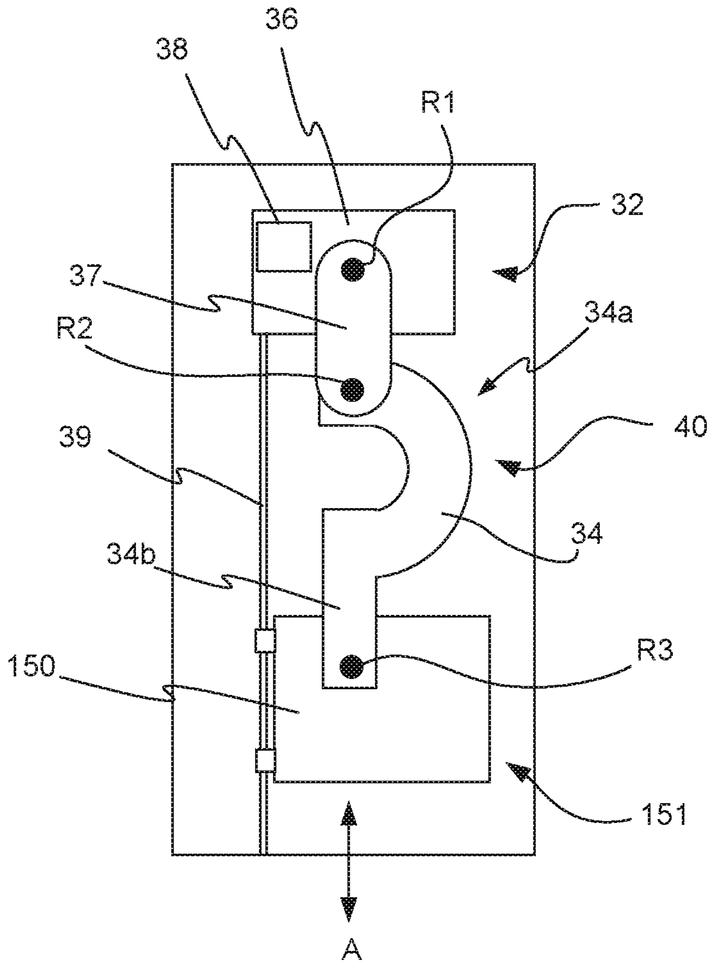
FIG. 5 is a schematic view of a treatment unit with a drive unit according to an embodiment.

FIG. 5 shows a drive unit 32 of the treatment unit 100. The drive unit 32 is configured to move the discharge device 150 between an operational position 41 (FIG. 6*a*) and an idle position 42 (FIG. 6*c*). This is achieved by means of a transmission 40, or mechanism 40, having different transmission ratios during the motion between the idle position 42 and the operational position 41, as soon will be described more in detail.

The different positions 41, 42 are preferably arranged close to the end positions of the drive unit 32. This means that some movement is still possible for calibration purposes.

The drive unit 32 is configured to move the discharge device 150 between a first position 41 and second position 42 relative to at least one thread 20. The first position 41 and the second position 42 are preferably arranged along the same axis. The axis may be the axis of movement A of the discharge device. In one embodiment, the axis of movement A of the discharge device 150 is perpendicular to the movement of the thread 20.

The first position 41 may be one or more operational positions where the discharge device 150 is configured to dispense one or more coating substances onto the at least one thread 20. In one embodiment, this position corresponds to when the nozzles 152*a*-*f* are aligned above the at least one thread 20.

The second position 42 may be one or more idle positions where the discharge device 150 is configured to no longer dispense one or more coating substances onto the at least one thread 20. In one embodiment, this position is used when the nozzles 152*a*-*f* are capped in order to seal them from air, such as during transport or storing. The idle position may be mechanically locked for transportation purposes. Other situations where it may be desired to move the discharge device 150 away from the thread 20 include cleaning, service, maintenance, etc.

As seen in FIG. 5, the drive unit 32 may be connected to the discharge device 150 by means of an actuator 34 and a crank 37. The actuator 34 and the crank 37 together form the mechanism 40, or transmission 40. The crank 37 is in the shape of a lever arm, having one end connected to a rotational axis R1 of an electric motor 36 of the drive unit 32, while the other end is pivotally connected to the actuator 34 at a rotational axis R2. The actuator 34 has an opposite end which in turn is pivotally connected to the discharge device 150 at a rotational axis R3. The transmission ratio can in the embodiment shown in FIG. 5 be seen as the correlation between the rotational movement of the crank 37, or the electric motor 36 of the drive unit 32, and the linear movement of the discharge device 150. Hence, the transmission ratio is the ratio of input rotation, to output linear translation of the discharge device 150. A low transmission ratio thus implies that a certain rotational movement input from the drive unit 32 or the crank 37 results in a small linear movement of the discharge device 150, while the opposite is true for a high transmission ratio. The relationship between rotational movement of the drive unit 32/crank 37 and the linear movement of the discharge device 150 will be further elaborated on below.

The thread treatment unit 100 may further comprise a spring member (not shown) arranged to bias the discharge device 150 towards its operational position 41 in order to reduce possible slack in the mechanism 40, improving the accuracy of the linear positional control of the discharge device 150.

The actuator 34 connects the crank 37 of the motor 36 to the discharge device 150. The actuator 34 may comprise a connecting rod having a curved portion 34*a* and a straight portion 34*b*; the curved portion 34*a* connects to the crank 37, while the straight portion 34*b* connects to the discharge device 150. The curved portion 34*a* allows the actuator 34 to accommodate the rotational axis of the drive unit 32, when the actuator 34 is positioned according to the idle position 42 as indicated in FIG. 6*c*.

The mechanism 40 is as mentioned configured to transform a rotational movement of the crank 37 to a linear motion of the discharge device 150.

The mechanism 40 is designed such that the transmission ratio during the motion between the idle position 41 and the operational position 42 is lower close to the end positions than between these positions. This will increase accuracy of the movement when aligning the discharge device 150 to the thread 20, as very precise movement is advantageous. Increased motion resolution is thereby achieved. The motor 36 may for example be a step motor or a DC motor. In the embodiment where the motor 36 is a DC motor, it may be advantageous if the drive unit 32 further comprises a position sensor 38. The position sensor 38 is configured to determine the position of the drive unit 32. The position sensor 38 is preferably in communication with the control unit 190. Regardless of the type of motor 36 used, a position sensor 38 may be configured to determine the position of the drive unit 32 in order to improve the accuracy of the system 10, and in particular to determine the position of the discharge device 150. For example, a specific angular position of the motor may be correlated with a specific linear position of the discharge device 150.

The transmission ratio during the motion from the idle position 41 towards the operational position 42 is preferably non-linear, and depends on the following parameters: the positions of the crank 37 and the actuator 34, their respective dimensions, the position of the respective pivot joints R1, R2, R3, and the current rotational position of the motor 36 of the drive unit 32.

The operation of the motor 36 may be controlled by the control unit 190. In order to avoid slip-stick, which usually occur during small movements, the control unit 190 may be configured to always use large movements, for example by moving back ten steps and forward eleven steps if one step forward is requested. This type of movement requires that the motor 36 is capable of moving quickly and accurately.

The component to be moved, i.e. the discharge device 150, is movable along an axis of movement A preferably perpendicular to the movement of the thread 20. In order to guide this movement, the drive unit 32 may further comprise a guiding member 39. The guiding member 39 may for instance be a guide rail or a groove. The first and/or second positions 41, 42 may be located close to the extreme ends of the axis of movement A.

Figure 6A:
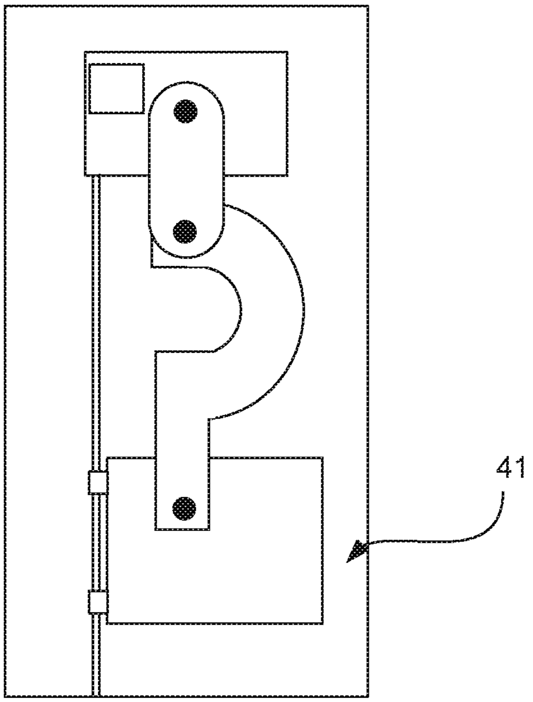
FIG. 6*a* is a schematic view of the treatment unit of FIG. 4, where the drive unit is in a first position.
Figure 6B:
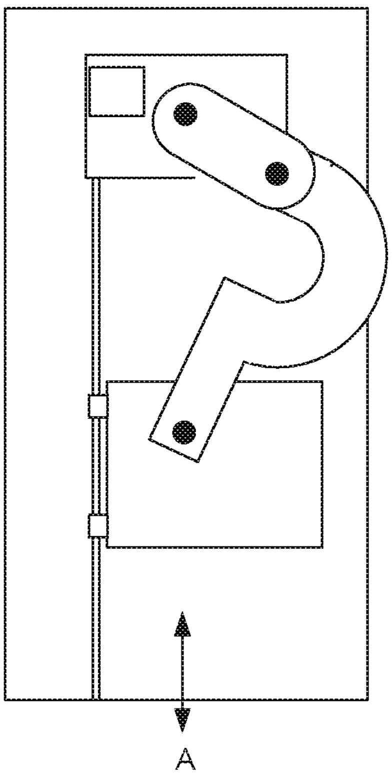
FIG. 6*b* is a schematic view of the treatment unit of FIG. 4, where the drive unit is in an intermediate position.
Figure 6C:
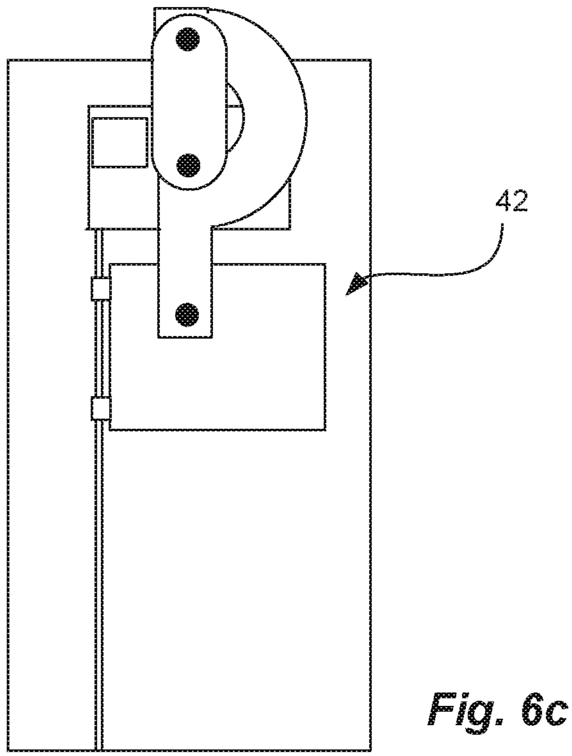
FIG. 6*c* is a schematic view of the treatment unit of FIG. 4, where the drive unit is in a second position.

FIGS. 6*a*-*c* illustrate the movement of the actuator 34 of the drive unit 32. The design of the mechanism 40 and the rotational movement of the motor 36, enhanced by the mechanism 40, leads to a specific transmission ratio characteristic from the motor 36 to the components to be moved.

In one embodiment, the transmission ratio is varying in a non-linear manner. The transmission ratio may for example approximately follow a cosine curve depending on the position of the crank 37 between rad $\pi \pm \pi/2$, wherein the first position 41 and/or the second position 42 is located near rad $\pi \pm \pi/2$. This is inherently true for the mechanism 40 shown in FIGS. 5 and 6, with the transmission ratio being at its maximum when the discharge mechanism 150, and thus the crank 37, is in or near the middle between its two end positions and decreasing to a minimum along a cosine curve as defined above towards each end position. The first position 41 and/or the second position 42 is arranged near the end positions of the reach of the mechanism 40, thus allowing accurate control of the discharge mechanism especially in the first 41 and/or second position 42.

The linear translational position of the discharge mechanism 150 is approximately given by $x = r \cos \alpha + l$, where x is distance from R1 to R3, r is distance from R1 to R2, $\alpha$ is the angle of the crank 37 as measured from the position shown in FIGS. 5 and 1 is the distance from R2 to R3. When the discharge mechanism 150 goes between these two positions 41, 42, the precision will be greater for the same angle of rotation of the motor as the discharge mechanism 150. This is so since the movement of the crank 37 will cause the discharge mechanism 150 to accelerate between the positions. However, once it is approaching one half of a lap (half a revolution), the precision will increase. In this position, it can be seen as being at the top of the cosine curve where the derivative is zero. Hence, the aim is to get different precision depending on whether the discharge mechanism 150 is close to the end of a half lap or if it is hallway there (¼ of a lap). The transmission ratio is thus non-linear.

In FIG. 6*a*, the discharge mechanism 150 can be seen as being at a position rad $0\pi$, whereas in FIG. 6*c*, the position can be seen as rad $1\pi$. A half-turn rotation means that the discharge mechanism 150 will move different distances depending on the angle (rotation) that the motor provides. The aim is to have as little movement on the discharge mechanism 150 as possible in the end positions, i.e. in the first 41 and second 42 positions.

In FIG. 6*a*, the discharge device 150 is arranged at its operational position 41, and is to be moved towards its idle position 42. During this initial movement, the crank 37 is at an angle such that the transmission 40 has a very low transmission ratio; a specific angular movement of the actuator 34 corresponds to a very small linear movement of the discharge device 150. Upon further rotation of the crank 37 the transmission ratio increases such that the motor 36 only needs a small rotation for the discharge device 150 to move far along the axis of movement A. In FIG. 6*b*, the discharge device 150 is moving away from the first position 41 and in FIG. 6*c*, the discharge device 150 is near the second 42 position. In this extreme position, the crank 37 is at an angle such that the transmission 40 has a low transmission ratio. This leads to an efficient, cheap and simple way to achieve a high accuracy near the first 41 and second 42 positions while still being able to move between them quickly.

In view of the above, the present invention provides significant advantages to in-line colouring of thread. For example, each colour of the treatment unit 100 may be associated with its own drive unit 32, and with its own movement. This allows for cleaning processes, such that the discharge device of a specific colour can be cleaned while other colours are used for in-line colouring. This in turn allows for increased time between service/maintenance/cleaning. In another embodiment it is possible to have two sets of primary colours which can be alternately be arranged in operational position and in idle position; no interruptions are thereby needed. Yet another advantage is when very long portions of the thread is to be coloured by a single colour, whereby un-used discharge devices can be in idle position and capped until they are again needed.

Although the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

What is claimed is:

1. A system for in-line treatment of thread for use with a thread consuming device, comprising:

a treatment unit comprising at least one discharge device being configured to dispense one or more coating substances onto the at least one thread when activated; and a drive unit being configured to move said at least one discharge device between an idle position and an operational position being arranged along an axis of movement, wherein the drive unit is configured to move said at least one discharge device by means of a mechanism providing different transmission ratios between the drive unit and the discharge device depending on the position of the discharge device along the axis of movement.

2. The system according to claim 1, wherein the transmission ratio of the mechanism is lower when the discharge device is in the operational position than when the discharge device is between the idle position and the operational position.

3. The system according to claim 1, wherein the transmission is configured to convert a rotary motion of the drive unit to a linear motion of the discharge device.

4. The system according to claim 1, further comprising a control unit being configured to control the operation of the drive unit.

5. The system according to claim 4, wherein the treatment unit further comprises a position sensor configured to determine at least one position of the drive unit, and wherein the control unit is configured to control the operation of the drive unit based on the determined position(s).

6. The system according to claim 1, wherein the mechanism comprises an actuator at one end connected to the discharge device and at a second end connected to a crank being connected to the drive unit, thus forming a rod and crank mechanism operatively connecting the discharge device and the drive unit.

7. The system according to claim 6, wherein the actuator comprises a connecting rod having a curved portion and a straight portion, and wherein the curved portion is configured to accommodate a rotational axis of the drive unit.

8. The system according to claim 6, wherein the transmission ratio is proportional to a cosine function depending on the position of the crank such that a maximum transmission ratio is achieved when the discharge device is between the idle position and the operational position.

9. The system according to claim 8, wherein the idle position and/or the operational position is located near rad $\pi \pm \pi/2$ as measured from the angular position of the crank when the discharge device is approximately in the middle between idle position and the operational position.

10. The system according to claim 1, wherein the drive unit comprises a motor.

11. The system according to claim 10, wherein the motor is a step motor.

12. The system according to claim 10, wherein the motor is a DC-motor.

13. The system according to claim 1, wherein the treatment unit comprises at least two discharge devices and a control unit, wherein each discharge device is associated with a separate drive unit, and wherein the control unit is configured to control selective activation of each one of the discharge devices and the drive units.

14. The system according to claim 1, wherein each discharge device comprises a plurality of nozzles arranged at different positions relative the longitudinal extension of the at least one thread, said at least one thread being in motion in use, each nozzle being configured to dispense one or more coating substances onto the at least one thread when activated.

15. The system according to claim 14, wherein the nozzles are inkjet nozzles.

16. The system according to claim 1, wherein the coating substance is a colouring sub stance.

17. The system according to claim 1, further comprising a thread consuming device.

18. The system according to claim 17, wherein the thread consuming device is an embroidery machine, a sewing machine, a knitting machine, a weaving machine, a tufting machine, a thread winding machine, or any combination thereof.

19. A method for in-line treatment of at least one thread, comprising:

providing a treatment unit comprising at least one discharge device being configured to dispense one or more coating substances onto the at least one thread when activated;

providing a drive unit, wherein the drive unit is configured to:

to move said at least one discharge device between an idle position and an operational position being arranged along an axis of movement, wherein the drive unit is configured to move said at least one discharge device by means of a mechanism providing different transmission ratios between the drive unit and the discharge device depending on the position of the discharge device along the axis of movement.

* * * * *